United States Patent
Kalhan et al.

(10) Patent No.: US 11,388,558 B2
(45) Date of Patent: Jul. 12, 2022

(54) ROBUST MULTICAST, SC-PTM, AND BROADCAST DELIVERY WITH NEIGHBOR UE'S ASSISTANCE

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 451 days.

(21) Appl. No.: 16/319,703

(22) PCT Filed: Jul. 27, 2017

(86) PCT No.: PCT/US2017/044123
§ 371 (c)(1),
(2) Date: Jan. 22, 2019

(87) PCT Pub. No.: WO2018/022854
PCT Pub. Date: Feb. 1, 2018

(65) Prior Publication Data
US 2021/0120372 A1 Apr. 22, 2021

Related U.S. Application Data

(60) Provisional application No. 62/367,982, filed on Jul. 28, 2016.

(51) Int. Cl.
*H04W 4/06* (2009.01)
*H04W 4/70* (2018.01)
(Continued)

(52) U.S. Cl.
CPC .............. *H04W 4/06* (2013.01); *H04L 1/1825* (2013.01); *H04W 4/70* (2018.02); *H04W 8/005* (2013.01); *H04W 76/14* (2018.02)

(58) Field of Classification Search
CPC ......... H04W 4/06; H04W 4/70; H04W 8/005; H04W 76/14; H04W 4/80; H04W 28/02; H04W 28/04; H04W 88/04; H04L 1/1825
See application file for complete search history.

(56) References Cited

U.S. PATENT DOCUMENTS

2012/0327760 A1 12/2012 Du et al.
2013/0089020 A1 4/2013 Hakola et al.
(Continued)

FOREIGN PATENT DOCUMENTS

JP 2001119332 A 4/2001
JP 2007266876 A 10/2007
(Continued)

*Primary Examiner* — Khaled M Kassim
*Assistant Examiner* — Kai Chang (57) ABSTRACT

In the event that a first user equipment (UE) device is unable to decode a packet received from a base station that provides Point-to-Multipoint (PTM) compatible services to UE devices within a service area (e.g., cell) of the base station, the first UE device transmits a request for retransmission of the packet. In one example, the request for retransmission is transmitted to one or more neighboring UE devices via a device-to-device (D2D) transmission. In response to the request for retransmission, one or more of the neighboring UE devices, which were able to successfully decode the same packet, retransmit the packet to the first UE device via a D2D communication link.

26 Claims, 4 Drawing Sheets

(51) Int. Cl.
  *H04W 76/14*  (2018.01)
  *H04L 1/18*   (2006.01)
  *H04W 8/00*   (2009.01)

(56) References Cited

U.S. PATENT DOCUMENTS

| | | |
|---|---|---|
| 2014/0086158 A1 | 3/2014 | Tavildar et al. |
| 2014/0169261 A1 | 6/2014 | Ming et al. |
| 2015/0023267 A1* | 1/2015 | Lim .................. H04W 72/0406 370/329 |
| 2015/0133132 A1 | 5/2015 | Li et al. |
| 2016/0014668 A1* | 1/2016 | Chou .................. H04W 76/14 455/7 |
| 2016/0119762 A1* | 4/2016 | Zhu ..................... H04W 4/10 370/312 |
| 2016/0150390 A1* | 5/2016 | Chen .................. H04W 40/246 370/311 |
| 2016/0286601 A1* | 9/2016 | Siomina ............ H04W 28/0278 |
| 2016/0338094 A1* | 11/2016 | Faurie .................. H04W 72/14 |
| 2016/0360563 A1* | 12/2016 | Lecroart ............... H04L 69/322 |
| 2017/0063595 A1* | 3/2017 | Ma ........................ H04W 72/04 |
| 2017/0127287 A1* | 5/2017 | Fujishiro ............... H04W 48/16 |
| 2017/0257192 A1* | 9/2017 | Wang ..................... H04L 1/189 |
| 2017/0310427 A1* | 10/2017 | Wakabayashi ........ H04L 1/1887 |
| 2018/0027429 A1* | 1/2018 | Li .......................... H04W 24/02 455/426.1 |
| 2019/0028232 A1* | 1/2019 | Kalhan ................. H04L 1/0014 |
| 2019/0312684 A1* | 10/2019 | Christoffersson ..... H04L 1/1812 |

FOREIGN PATENT DOCUMENTS

| | | |
|---|---|---|
| WO | 2008074380 A1 | 6/2008 |
| WO | 2014003022 A1 | 1/2014 |
| WO | 2015/020379 A1 | 2/2015 |

* cited by examiner

ROBUST MULTICAST, SC-PTM, AND BROADCAST DELIVERY WITH NEIGHBOR UE'S ASSISTANCE

CLAIM OF PRIORITY

The present application claims priority to Provisional Application No. 62/367,982, entitled "ROBUST MULTICAST, SC-PTM, AND BROADCAST DELIVERY WITH NEIGHBOR UE'S ASSISTANCE", filed Jul. 28, 2016, assigned to the assignee hereof and hereby expressly incorporated by reference in its entirety.

FIELD

This invention generally relates to wireless communications and more particularly to retransmission of packets in a radio access network.

BACKGROUND

Multimedia Broadcast Multicast Service (MBMS) is a Point-to-Multipoint (PTM) interface specification designed to provide efficient delivery of broadcast and multicast services within 3rd Generation Partnership Project (3GPP) cellular networks. Examples of MBMS interface specifications include those described in Universal Mobile Telecommunications System (UMTS) and Long Term Evolution (LTE) communication specifications. For broadcast transmission across multiple cells, the specifications define transmission over single-frequency network configurations. Intended applications include mobile TV, news, radio broadcasting, file delivery, emergency alerts, and others. When services are broadcasted by MBMS, all cells inside an MBSFN (Multimedia Broadcast multicast service Single Frequency Network) area transmit the same MBMS service.

Users access these services and obtain the MBMS content through wireless communication devices such as cellular phones, tablets, laptops, and other devices with wireless transceivers that communicate with the base stations within the communication system. The base stations, sometimes referred to as eNodeBs or eNBs, provide wireless services to the wireless communication devices, sometimes referred to as user equipment (UE), within cells.

A user can access at least some multimedia services through a UE device using either a Point-to-Point (PTP) connection or a Point-to-Multipoint (PTM) transmission. In 3GPP systems, PTP services can be provided using Unicast techniques and PTM transmissions can be provided using MBMS communication, transmitted over a Multicast Broadcast Single Frequency Network (MBSFN) or Single Cell-Point to Multipoint (SC-PTM) communication. In systems operating in accordance with a revision of 3GPP Long Term Evolution (LTE) communication specification, MBMS is provided using eMBMS. Accordingly, a PTM compatible service can be provided using either Unicast service, MBSFN or SC-PTM in an LTE system.

SUMMARY

In the event that a first user equipment (UE) device is unable to decode a packet received from a base station that provides Point-to-Multipoint (PTM) compatible services to UE devices within a service area (e.g., cell) of the base station, the first UE device transmits a request for retransmission of the packet. In one example, the request for retransmission is transmitted to one or more neighboring UE devices via a device-to-device (D2D) transmission. In response to the request for retransmission, one or more of the neighboring UE devices, which were able to successfully decode the same packet, retransmit the packet to the first UE device via a D2D communication link.

DETAILED DESCRIPTION

Broadcast, multicast or Single-Cell Point-to-Multipoint (SC-PTM) transmissions are designed such that a target number of user equipment (UE) devices are able to decode the data packets successfully. As with all existing broadcast mechanisms, including SC-PTM, the broadcast is not guaranteed to reach all UE devices within a cell. In most cases, the broadcast transmissions are designed to provide a Block Error Rate (BLER), where the BLER<1% for 95% of the UE devices in the cell.

If higher robustness is needed, and if the worst-channel condition information is available (e.g., with Channel State Information (CSI) feedback), then one viable solution is for the base station to transmit the data robustly enough to overcome those channel conditions. However, this may require additional resources if the broadcast data needs to be transmitted at a lower Modulation and Coding Scheme (MCS) to allow UE devices located at the cell edge to receive the broadcast successfully. Alternatively, higher power broadcast transmissions may be used, but the increase in transmission power may result in increased interference to cells located outside of the MBMS service region (e.g., in the case of SC-PTM, the service region is the single cell being served by SC-PTM transmissions).

Other approaches for higher broadcast robustness are based on the use of Hybrid Automatic Repeat Request (HARQ) feedback from the UE devices that were unable to decode the data successfully. For example, if a UE device cannot decode a data packet, the UE device sends a negative acknowledgement (NACK) signal (e.g., HARQ feedback) to the base station that transmitted the data packet. The base station can then apply link-adaptation for the retransmissions to increase the likelihood that the UE device will be able to successfully decode the retransmitted packet.

However, several factors need to be considered. First, due to the nature of the broadcast data, there may be a very limited time for HARQ retransmissions, at most a few tens of milliseconds. For example, the UE device must transmit the NACK and the base station must retransmit the packet fast enough to justify introduction of HARQ retransmissions. Second, there is an increase in complexity to handle the reception of HARQ feedback from multiple UE devices that may not justify the gains achieved by utilizing HARQ feedback in the first place.

Another issue with the use of HARQ feedback and/or CSI feedback is the lack of applicability to UE devices that are in an IDLE state since IDLE UE devices may also receive SC-PTM transmissions. For example, if an IDLE UE device needed to send a NACK to the base station, the IDLE UE device would have to transmit a connection request to the network in order to transition from the IDLE state to a CONNECTED state, which is required to transmit the NACK. Although such a transition is possible so that the UE device can provide the HARQ or CSI feedback, the increased signaling to transition the UE device to the CONNECTED state cannot be justified solely for the purpose of allowing the UE device to transmit feedback to the base station.

In the example discussed herein, one or more of the neighboring UE devices perform the retransmission instead of the base station. If a UE device is unable to decode a packet it received on a broadcast, multicast, or SC-PTM transmission from a base station, then the UE device transmits a request for retransmission. In one example, the request for retransmission is transmitted to one or more neighboring UE devices via a device-to-device (D2D) communication link or a D2D discovery signal. In response to the request for retransmission, one or more of the neighboring UE devices, which were able to decode the same data packet that the UE device requesting retransmission could not decode, retransmit the same data packet on a D2D communication link to the UE device requesting retransmission.

A retransmission from a neighboring UE device can have several advantages over a retransmission from the base station. First, the distance between the UE devices can be less than the distance between the base station and the UE device requesting retransmission, which facilitates reception of the retransmitted packet by the UE device requesting retransmission. Second, the system can be set up such that the neighboring UE device, which is closest to and/or has the best signal path to the UE device requesting retransmission, is selected to perform the retransmission. Third, in other examples, multiple neighboring UE devices could retransmit the packet to the requesting UE device, providing transmission diversity to the requesting UE device. Fourth, since the retransmissions are from the neighboring UE devices and not from the base station, it is not necessary for the UE device requesting retransmission to determine the proper system timing for the retransmission using the existing control information for SC-PTM. Rather, the reception of the retransmitted packets will depend entirely on the D2D mechanisms and the higher layers to coordinate the reception of these retransmitted packets. This can be significant because D2D retransmissions from neighboring UE devices may actually reduce the latency for the requesting UE device to successfully receive the retransmitted packets when compared to the periodicity of SC-PTM retransmissions configured by the base station.

Figure 1:
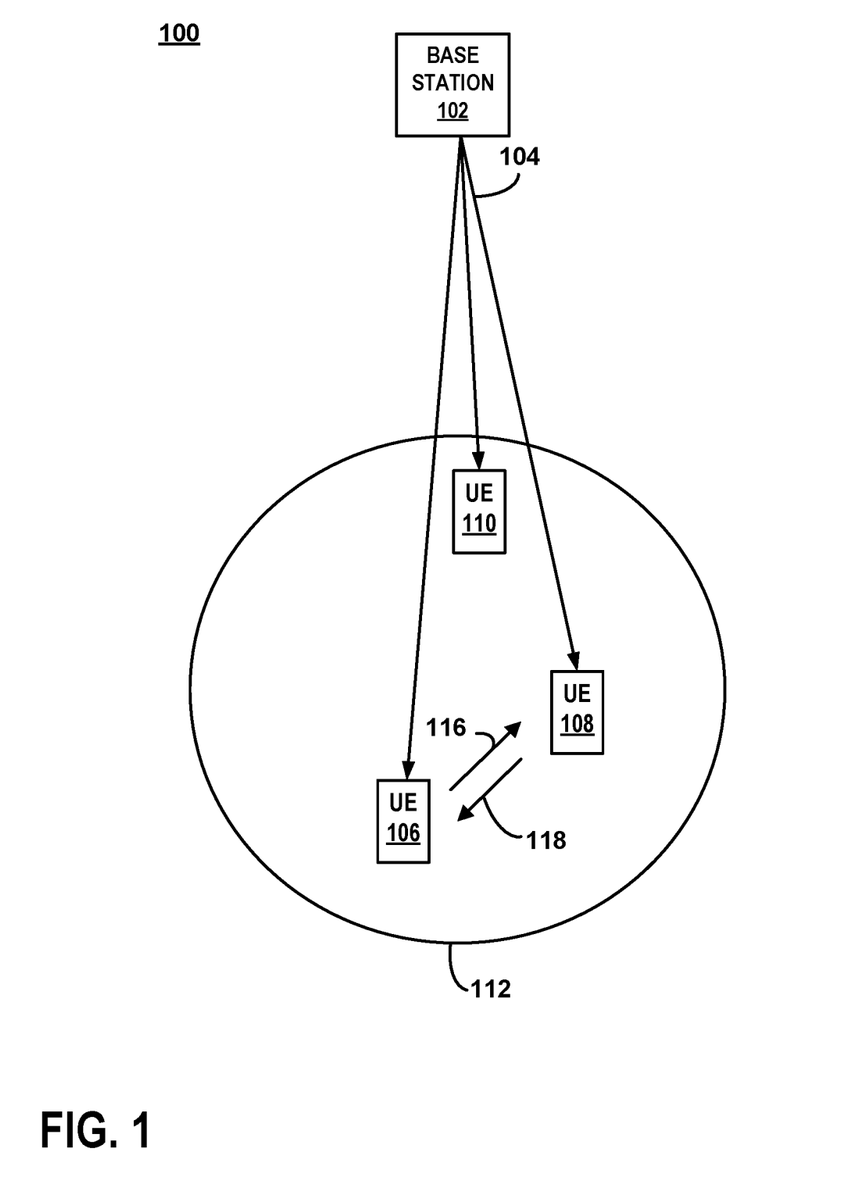
FIG. 1 is a block diagram of a communication system for an example in which a first user equipment (UE) device receives a retransmission from a second UE device.

FIG. 1 is a block diagram of a communication system for an example in which a first user equipment (UE) device receives a retransmission from a second UE device. The communication system 100 is part of a radio access network (not shown) that provides various wireless services to UE devices that are located within the respective service areas of the various base stations that are part of the radio access network. The base station 102 provides wireless services to UE devices 106, 108, 110 via downlink signals 104.

In the interest of clarity and brevity, communication system 100 is shown as having a single base station 102, which provides wireless services to UE devices 106, 108, 110, which are located within cell 112. However, in other examples, communication system 100 could have any suitable number of base stations. In the example of FIG. 1, cell 112 is represented by a circle, although a typical communication system 100 would have a plurality of cells having variously shaped geographical service areas. Base station 102, sometimes referred to as an eNodeB or eNB communicates with the wireless user equipment (UE) devices 106, 108, 110 by transmitting downlink signals 104 to the UE devices 106, 108, 110 and receiving uplink signals transmitted from the UE devices 106, 108, 110. The UE devices 106, 108, 110 are any wireless communication devices such as mobile phones, transceiver modems, personal digital assistants (PDAs), and tablets, for example.

Figure 2A:
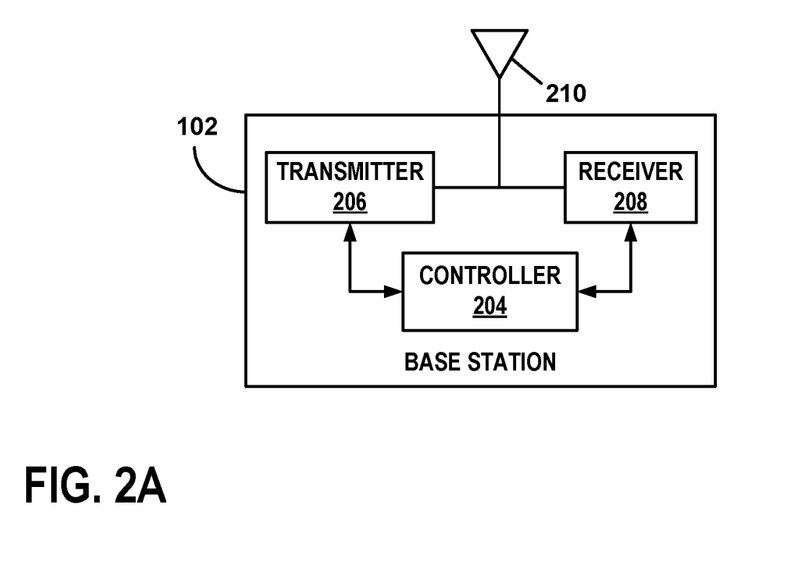
FIG. 2A is a block diagram of an example of the base station shown in FIG. 1.

Base station 102 is connected to the network through a backhaul (not shown) in accordance with known techniques. As shown in FIG. 2A, base station 102 comprises controller 204, transmitter 206, and receiver 208, as well as other electronics, hardware, and code. The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location. Accordingly, the base station 102 may be a portable user device such as a UE device in some circumstances.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals 104 and can apply any one of a plurality of modulation orders. The demodulator demodulates any signals received at the base station 102 in accordance with one of a plurality of modulation orders.

Returning to FIG. 1, the communication system 100 provides various wireless services to the UE devices 106, 108, 110 via base station 102. For example, the base station 102 provides Point-to-Multipoint (PTM) compatible services to UE devices 106, 108, 110 via broadcast, multicast, and/or Single-Cell Point-to-Multipoint (SC-PTM) transmissions 104. As discussed herein, a PTM compatible service is any combination of data, communication, service, and/or content that can be provided by PTM techniques. In most situations, the PTM compatible service can be provided by Multimedia Broadcast Multicast Service (MBMS) over a Multicast Broadcast Single Frequency Network (MBSFN), Single-Cell Point-to-Multipoint (SC-PTM) service and/or Unicast service using Point-to-Point (PTP) techniques. Some examples of PTM compatible services include mobile TV, news, radio broadcasting, file delivery, emergency alerts, as well as others. For the examples herein, the communication system 100 operates in accordance with at least one revision of the 3rd Generation Partnership Project Long Term Evolution (3GPP LTE) communication specification and can provide PTM compatible services using at least MBMS over a MBSFN such as enhanced MBMS (eMBMS), SC-PTM, and unicast. Other mechanisms may be used in some circumstances.

Figure 2B:
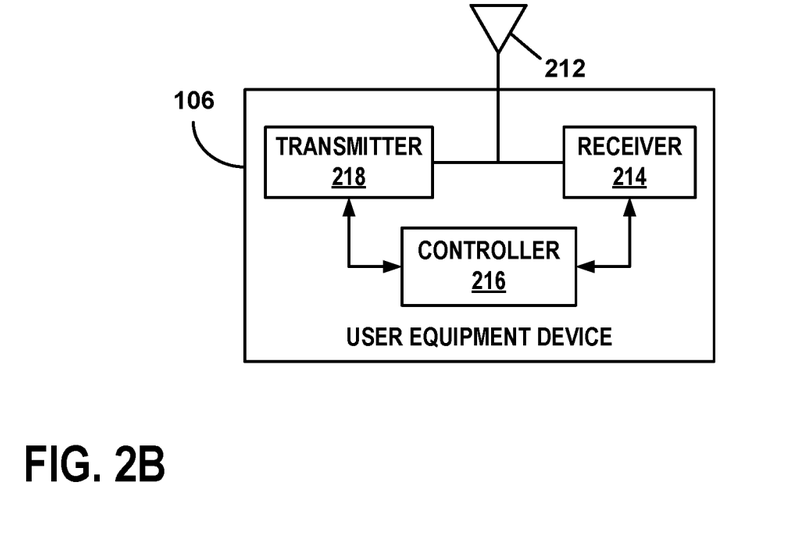
FIG. 2B is a block diagram of an example of the UE devices shown in FIG. 1.

A first UE device 106 receives the downlink signal 104 via antenna 212 and receiver 214, as shown in FIG. 2B. Although FIG. 2B specifically depicts the circuitry and configuration of first UE device 106, the same UE device circuitry and configuration is utilized for second UE device 108 and third UE device 110 in communication system 100. Besides antenna 212 and receiver 214, the first UE device 106 further comprises controller 216 and transmitter 218, as well as other electronics, hardware, and code. The first UE device 106 is any fixed, mobile, or portable equipment that performs the functions described herein. The various functions and operations of the blocks described with reference to the first UE device 106 may be implemented in any number of devices, circuits, or elements. Two or more of the functional blocks may be integrated in a single device, and the functions described as performed in any single device may be implemented over several devices.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device.

The transmitter 218 includes a modulator (not shown), and the receiver 214 includes a demodulator (not shown). The modulator can apply any one of a plurality of modulation orders to modulate the signals to be transmitted as part of the uplink signals (not shown) and/or D2D transmission 116, which is shown in FIG. 1. The demodulator demodulates the downlink signal 104 in accordance with one of a plurality of modulation orders.

Upon receipt of the downlink signal 104, the first UE device 106 demodulates the downlink signal 104, which yields encoded data packets that contain data pertaining to at least one of the wireless services being provided to the UE devices 106, 108, 110 within cell 112. The first UE device 106 attempts to decode at least one of the encoded data packets, using controller 216. If the data packet is successfully decoded, the first UE device 106 presents the decoded data to the user of the first UE device 106 in an appropriate manner. For example, audio data is presented as an audio file and/or output, text data is presented as a text file and/or output, and video data is presented as a video file and/or output.

However, if the first UE device 106 cannot successfully decode at least one of the encoded data packets, the first UE device 106 sends a request for retransmission to one or more of the neighboring UE devices 108, 110. In the example shown in FIG. 1, the request for retransmission is a negative acknowledgement (NACK) signal, which indicates that at least one of the encoded data packets contained in downlink signal 104 was not successfully decoded. The request for retransmission can be sent in several different manners.

In the example shown in FIG. 1, the first UE device 106 transmits a request for retransmission, using transmitter 218 and antenna 212, to at least one of the neighboring UE devices 108, 110. At least one of the neighboring UE devices 108, 110 are configured to receive, using its own antenna 212 and receiver 214, the request for retransmission. In the example of FIG. 1, the request for retransmission is a device-to-device (D2D) transmission 116. The D2D transmission 116 is sent from the first UE device 106 using transmitter 218 and antenna 212. The D2D transmission 116 can be at least one of (1) a D2D discovery transmission, and (2) a D2D transmission over a D2D communication link. In the example of FIG. 1, the second UE device 108 receives the D2D transmission 116 from the first UE device 106. The second UE device 108 receives the D2D transmission 116 using its own antenna 212 and receiver 214.

Regardless of the manner of transmitting the request for retransmission, the request for retransmission may include one or more of the following: a packet identifier for the packet to be retransmitted, a UE identifier (UE ID), a Proximity Services identifier (ProSe ID), a D2D resource location for retransmission, and a group identifier. ProSe is a D2D technology that allows LTE devices to detect each other and to communicate directly. The group identifier can be Temporary Mobile Group Identity (TMGI) and/or Group Radio Network Temporary Identifier (G-RNTI) information.

These two group identifiers are meant to be associated with specific broadcast services. The base station also provides this information in the broadcast related control information so that each UE device will only need to monitor services that are identified as being of interest to the user of each particular UE device. Regardless of the group identifier used, the transmitter 218 of the second UE device 108 can be configured, in some examples, to retransmit the packet if the first UE device 106 and the second UE device 108 are interested in the same broadcast service that is identified by the group identifier. Thus, the second UE device 108 should have already received the packet that the first UE device 106 was unable to decode, if the first and second UE devices are both monitoring the same broadcast service. However, in some cases, none of the neighboring UE devices 108, 110 are interested in the same service as the first UE device 106. Thus, in these cases, if the neighboring UE device 108 notices that no other UE device 110 has provided the retransmission of the requested packet, the neighboring UE device 108 has the option to receive the requested packet from the eNB 102 in one of the scheduled retransmissions and relay the requested packet to the first UE device 106. Each of the foregoing items can facilitate the determination by one or more of the neighboring UE devices 108, 110 of (1) which packet(s) to retransmit, (2) whether to retransmit the requested packet(s), and/or (3) the manner in which the requested packet should be retransmitted to the first UE device 106.

Upon receiving the request for retransmission, the second UE device 108 determines whether to retransmit the requested packet to the first UE device 106. The second UE device 108 may use different criteria to make this determination. For example, the second UE device 108 may use its own controller 216 to compare a signal strength of the received request for retransmission with a threshold, and if the signal strength exceeds the threshold, then the second UE device 108 will retransmit the requested packet to the first UE device 106. In one example, the threshold is a Signal-to-Interference-plus-Noise Ratio (SINR) threshold. However, any other suitable threshold could be used. Regardless of the threshold used, the second UE device 108 utilizes its transmitter 218 and antenna 212 to retransmit the requested packet, via a first D2D communication link 118, to the first UE device 106, if the signal strength of the received request for retransmission exceeds the threshold.

Alternatively, or in addition to the threshold determination described above, the second UE device 108 may use its own controller 216 to determine whether the request for retransmission was received within a retransmission time-window, and if the request for retransmission was received within the retransmission time-window, then the second UE device 108 will retransmit the requested packet to the first UE device 106. The retransmission time-window is important because it may be configured to ensure that neighboring UE devices 108, 110 do not retransmit packets after a time in which receipt of the retransmitted packet would be useful. For example, with mobile TV, if the requested packet is for a video frame of mobile TV that has already been viewed by the user of the first UE device 106, it would be a waste of resources for any of the neighboring UE devices 108, 110 to retransmit the packet. Stated differently, if the requested packet cannot be retransmitted to the first UE device 106 with enough time to decode the packet and present it to the user of the first UE device 106 at a time that is useful to the user, then the packet will not be retransmitted. Once the determination has been made that the request for retransmission was received within the retransmission time-window, the second UE device 108 utilizes its transmitter 218 and antenna 212 to retransmit the requested packet, via the first D2D communication link 118, to the first UE device 106.

If the system 100 is configured to allow multiple neighboring UE devices to retransmit the requested packet, as will be discussed more fully below, the number of neighboring UE devices that are permitted to retransmit can be controlled by adjusting the threshold and/or the duration of the retransmission time-window. For example, a greater number of neighboring UE devices can be permitted to retransmit the requested packet by lowering the threshold and/or increasing the duration of the retransmission time-window. Conversely, a lower number of neighboring UE devices can be permitted to retransmit the requested packet by increasing the threshold and/or decreasing the duration of the retransmission time-window.

In the example shown in FIG. 1, the receiver 214 of the first UE device 106 is configured to receive the retransmission of the packet from the second UE device 108 via the first D2D communication link 118. It can be advantageous to receive the retransmission from a single neighboring UE device, as shown in FIG. 1, since such a system configuration utilizes fewer resources and involves less complexity than would be required to retransmit the requested packet from multiple neighboring UE devices 108, 110. In a system configured to ensure that only one neighboring UE device retransmits the requested packet, a third UE device 110 includes a controller 216 configured to determine whether the second UE device 108 has already retransmitted the packet to the first UE device 106. The third UE device 110 also has a transmitter 218 configured to refrain from retransmitting the packet to the first UE device 106, in response to determining that the second UE device 108 has already retransmitted the packet to the first UE device 106. In one example, the third UE device 110 may determine that the second UE device 108 has already retransmitted the requested packet by receiving the retransmitted packet by listening in to the D2D communication link between the second UE device 108 and the first UE device 106. Alternatively, the second UE device 108 may transmit a message to other neighboring UE devices within cell 112 indicating that the second UE device 108 has already retransmitted the requested packet to the first UE device 106. In yet another example, the first UE device 106 may be configured to transmit an ACK response to the neighboring UE devices within cell 112 indicating that the first UE device 106 has successfully received the retransmitted packet.

Conversely, retransmitting the requested packet from multiple neighboring UE devices 108, 110 allows for transmission diversity, which increases the likelihood of a successful retransmission to the first UE device 106 when compared to a single retransmission from a single neighboring UE device. In the event that multiple neighboring UE devices 108, 110 are configured to retransmit the requested packet, the receiver 214 of the first UE device 106 is configured to receive a retransmission of the packet from the third UE device 110 via a second D2D communication link (not shown) between the third UE device 110 and the first UE device 106. Thus, the receiver 214 of the first UE device 106 is configured to receive retransmissions from both the second UE device 108 and the third UE device 110 over a first D2D communication link and a second D2D communication link, respectively.

Figure 3:
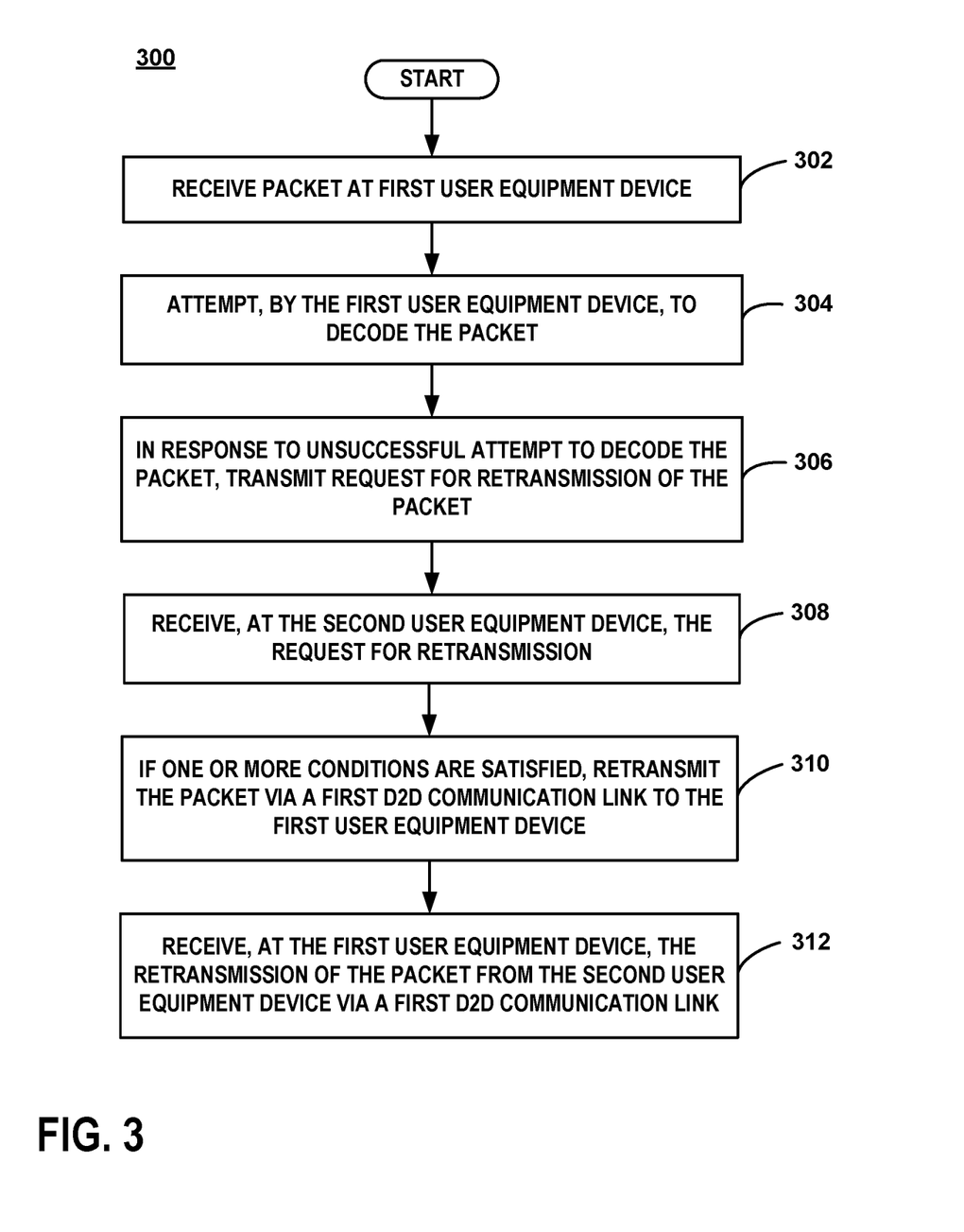
FIG. 3 is a flowchart of an example of a method in which a first UE device receives a retransmission from a second UE device.

FIG. 3 is a flowchart of an example of a method in which a first UE device receives a retransmission from a second UE device. The method 300 begins at step 302 in which a packet is received at the first UE device 106. As described above, the first UE device 106 attempts to decode the received packet, at step 304. If the attempt to decode the packet is successful, the first UE device 106 presents the decoded data to the user of the first UE device 106 in an appropriate manner.

However, if the attempt to decode the packet is unsuccessful, the first UE device 106 transmits a request for retransmission, at step 306. The request for retransmission is sent as a D2D transmission to one or more neighboring D2D UE devices. The D2D transmission can include (1) a D2D transmission over a D2D communication link, and/or (2) a D2D discovery transmission. In some examples, the request for retransmission is a NACK signal. The request for retransmission may include one or more of the following: a packet identifier for the packet to be retransmitted, a UE identifier (UE ID), a Proximity Services identifier (ProSe ID), a D2D resource location for retransmission, and a group identifier. If a group identifier is used, the transmitter 218 of the second UE device 108 can be configured to retransmit the packet if the first UE device 106 and the second UE device 108 are interested in the same broadcast service that is identified by (e.g., associated with) the particular group identifier set forth in the request for retransmission.

At step 308, the request for retransmission is received at the second UE device 108. At step 310, the second UE device 108 determines whether to retransmit the requested packet via first D2D communication link 118 to the first UE device 106, based on whether one or more conditions are satisfied. For example, the second UE device 108 may compare a signal strength of the received request for retransmission with a threshold, and if the signal strength exceeds the threshold, then the second UE device 108 will retransmit the requested packet to the first UE device 106. Alternatively, or in addition to the threshold determination, the second UE device 108 may determine whether the request for retransmission was received within a retransmission time-window, and if the request for retransmission was received within the retransmission time-window, then the second UE device 108 will retransmit the requested packet to the first UE device 106. At step 312, the first UE device 106 receives the retransmission of the requested packet from the second UE device 108 via first D2D communication link 118.

Figure 4:
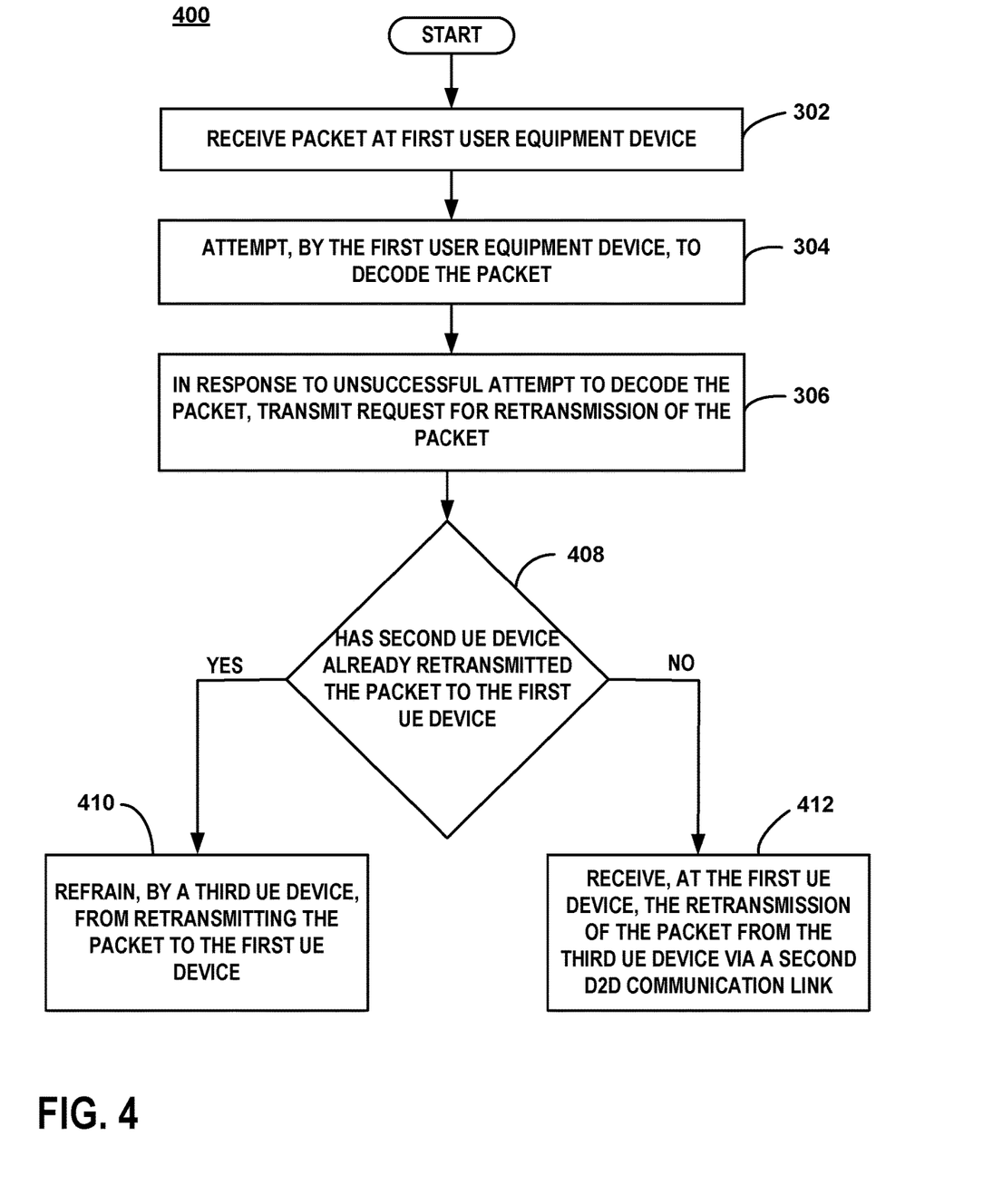
FIG. 4 is a flowchart of an example of a method in which a determination is made whether a third UE device should retransmit a packet to the first UE device.

FIG. 4 is a flowchart of an example of a method in which a determination is made whether a third UE device should retransmit a packet to the first UE device. The method 400 begins with steps 302, 304, and 306, as described above in connection with FIG. 3. However, method 400 presumes that multiple neighboring UE devices 108, 110 receive the request for retransmission from the first UE device 106. In some examples, multiple UE devices are permitted to retransmit the requested packet without any regard to whether any other neighboring UE devices have already retransmitted the requested packet. In these instances, each neighboring UE device 108, 110 makes its own determination whether to retransmit the requested packet to the first UE device 106 via a D2D communication link. Thus, the first UE device 106 could (1) receive a first retransmission of the requested packet from the second UE device 108 via a first D2D communication link, and (2) receive a second retransmission of the requested packet from the third UE device 110 via a second D2D communication link.

As described above, one reason for allowing multiple neighboring UE devices to retransmit the requested packet is to obtain transmission diversity, which increases the likelihood that first UE device 106 successfully receives the retransmission of the requested packet. Additionally, by allowing retransmissions from multiple neighboring UE devices, the neighboring UE devices 108, 110 will not need to determine whether another neighboring UE device has already retransmitted or will be retransmitting the requested packet. Therefore, the processing complexity at the neighboring UE devices 108, 110 and the need for additional messaging may be reduced. Rather, any additional complexity is handled at the first UE device 106. For example, if the first UE device 106 successfully receives the requested packet from one neighboring UE device, the first UE device 106 may ignore any other retransmissions of the same packet.

In the example shown in FIG. 4, however, the system 100 is configured to allow only one neighboring UE device to retransmit the requested packet. Thus, at step 408, it is determined whether the second UE device 108 has already retransmitted the packet to the first UE device 106. The various methods of determining whether another neighboring UE device has already retransmitted the packet to the first UE device 106 are set forth above. If the second UE device 108 has already retransmitted the packet to the first UE device 106, the third UE device 110 refrains from retransmitting the requested packet to the first UE device 106, at step 410. If the second UE device 108 has not retransmitted the packet to the first UE device 106, the third UE device 110 retransmits the requested packet to the first UE device 106. At step 412, the first UE device 106 receives the retransmission of the requested packet via a second D2D communication link between the third UE device 110 and the first UE device 106.

Although the foregoing discussion describes ensuring that only a single neighboring UE device retransmits the requested packet to the first UE device 106, the system 100 may be modified to ensure that any particular number of neighboring UE devices retransmit the packet to the first UE device 106, with all other neighboring UE devices refraining from retransmitting the packet once the desired number of neighboring UE devices have retransmitted the packet to the first UE device 106. However, if all neighboring UE devices are allowed to retransmit the packet, then it is not necessary for neighboring UE devices to refrain from retransmitting the packet, and the process for monitoring other neighboring UE devices' retransmissions will not be needed.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
  receiving an encoded packet at a first user equipment (UE) device;
  attempting, by the first UE device, to decode the encoded packet;
  in response to successfully attempting to decode the encoded packet to retrieve decoded data, presenting the decoded data to a first user;
  in response to unsuccessfully attempting to decode the encoded packet, transmitting a request for retransmission of the encoded packet;

receiving, at a second UE device, the request for retransmission;
determining, at the second UE device, whether the request for retransmission was received within a retransmission time-window;
if the request for retransmission was received within the retransmission time-window, retransmitting, by the second UE device, the encoded packet, via a first D2D communication link to the first UE device;
receiving, at the first UE device, the retransmission of the encoded packet from the second UE device via the first D2D communication link, the first UE device associated with the first user and the second UE device associated with a second user; and
successfully decoding the retransmitted encoded packet to retrieve the decoded data.

2. The method of claim 1, wherein the request for retransmission is transmitted via a device-to-device (D2D) transmission.

3. The method of claim 2, wherein the D2D transmission comprises at least one of the following: a D2D transmission over a D2D communication link and a D2D discovery transmission.

4. The method of claim 2, wherein the D2D transmission occurs while the first UE device is in an IDLE state.

5. The method of claim 1, wherein the request for retransmission comprises one or more of the following: a packet identifier for the encoded packet to be retransmitted, a UE identifier (UE ID), a Proximity Services identifier (ProSe ID), a D2D resource location for retransmission, and a group identifier.

6. The method of claim 1, further comprising:
comparing, at the second UE device, a signal strength of the received request for retransmission with a threshold;
if the signal strength exceeds the threshold, retransmitting, by the second UE device, the encoded packet, via the first D2D communication link, to the first UE device.

7. The method of claim 5, wherein the second UE device retransmits the encoded packet if the first UE device and the second UE device are interested in a same broadcast service associated with a particular group identifier.

8. The method of claim 7, wherein the D2D transmission occurs while the second UE device is in an IDLE state.

9. The method of claim 1, further comprising:
determining whether the second UE device has already retransmitted the encoded packet to the first UE device;
in response to determining that the second UE device has already retransmitted the encoded packet, refraining, by a third UE device, from retransmitting the encoded packet to the first UE device.

10. The method of claim 1, further comprising:
receiving, at the first UE device, a retransmission of the encoded packet from a third UE device via a second D2D communication link.

11. A system comprising:
a first user equipment (UE) device comprising:
a receiver configured to receive an encoded packet,
a controller configured to decode the encoded packet and to present decoded data to a first user when the encoded packet is successfully decoded, the decoded data retrieved by successfully decoding the encoded packet, and
a transmitter configured to transmit a request for retransmission, in response to an unsuccessful attempt to decode the encoded packet,
the receiver further configured to receive a retransmission of the encoded packet from a second UE device via a first D2D communication link, the first UE device associated with the first user and the second UE device associated with a second user, the controller further configured to decode the retransmitted encoded packet to retrieve the decoded packet;
a second UE device comprising:
a receiver configured to receive the request for retransmission from the first UE device,
a controller configured to determine whether the request for retransmission was received within a retransmission time-window, and
a transmitter configured to retransmit the encoded packet, via the first D2D communication link, to the first UE device, if the request for retransmission was received within the retransmission time-window.

12. The system of claim 11, wherein the request for retransmission is transmitted via a device-to-device (D2D) transmission.

13. The system of claim 12, wherein the D2D transmission comprises at least one of the following: a D2D transmission over a D2D communication link and a D2D discovery transmission.

14. The system of claim 12, wherein the D2D transmission occurs while the first UE device is in an IDLE state.

15. The system of claim 11, wherein the request for retransmission comprises one or more of the following: a packet identifier for the encoded packet to be retransmitted, a UE identifier (UE ID), a Proximity Services identifier (ProSe ID), a D2D resource location for retransmission, and a group identifier.

16. The system of claim 11, further comprising:
the second UE device comprising:
the controller configured to compare a signal strength of the received request for retransmission with a threshold, and
the transmitter configured to retransmit the encoded packet, via the first D2D communication link, to the first UE device, if the signal strength exceeds the threshold.

17. The system of claim 15, wherein the transmitter of the second UE device is configured to retransmit the encoded packet if the first UE device and the second UE device are interested in a same broadcast service associated with a particular group identifier.

18. The system of claim 11, further comprising:
a third UE device comprising:
a controller configured to determine whether the second UE device has already retransmitted the encoded packet to the first UE device, and
a transmitter configured to refrain from retransmitting the encoded packet to the first UE device, in response to determining that the second UE device has already retransmitted the encoded packet.

19. The system of claim 11, wherein the receiver of the first UE device is further configured to receive a retransmission of the encoded packet from a third UE device via a second D2D communication link.

20. A first user equipment (UE) device comprising:
a receiver configured to attempt to decode an encoded packet received at the first UE device;
a controller configured to present decoded data to a first user in response to successfully decoding the encoded packet to retrieve the decoded data; and a transmitter configured to transmit a request for retransmission of the encoded packet in response to the receiver unsuccessfully decoding the encoded packet, wherein the request for retransmission is received at a second UE device to determine whether the request for retransmission was received within a retransmission time-window, if the request for retransmission was received within the retransmission time-window, the second UE device retransmits the encoded packet, via a first D2D communication link to the first UE device, the receiver configured to receive a retransmission of the encoded packet from a second UE device via a first D2D communication link and configured to decode the retransmitted encoded packet, the first UE device associated with the first user and the second UE device associated with a second user.

21. The first UE device of claim 20, wherein the transmitter is configured to transmit the request for retransmission to the second UE device.

22. The first UE device of claim 20, wherein the transmitter is configured to transmit the request for retransmission to a plurality of UE devices including the second UE device.

23. The first UE device of claim 20, wherein the receiver is configured to attempt to decode the encoded packet transmitted from a base station and received at the first UE device.

24. A first user equipment (UE) device comprising:
a receiver configured to receive, from a second UE device, a request for retransmission of an encoded packet that was received and unsuccessfully decoded at the second UE device;
a controller configured to determine whether the request for retransmission was received within a retransmission time-window, and to determine whether any other UE device has already retransmitted the encoded packet to the first UE device; and
a transmitter configured to retransmit the encoded packet to the first UE device only if the encoded packet has not been retransmitted and only if the request for retransmission was received within the retransmission time-window, via a first D2D communication link to the second UE device.

25. The first UE device of claim 24, wherein:
the controller is configured to determine whether the request for retransmission was received within a retransmission time-window, and
the transmitter is configured to retransmit the encoded packet to the first UE device only if the request for retransmission was received within the retransmission time-window.

26. The first UE device of claim 24, wherein:
the controller is configured to compare a signal strength of the received request for retransmission with a threshold, and
the transmitter is configured to retransmit the encoded packet to the first UE device only if the signal strength exceeds the threshold.

* * * * *